United States Patent Office 3,644,483
Patented Feb. 22, 1972

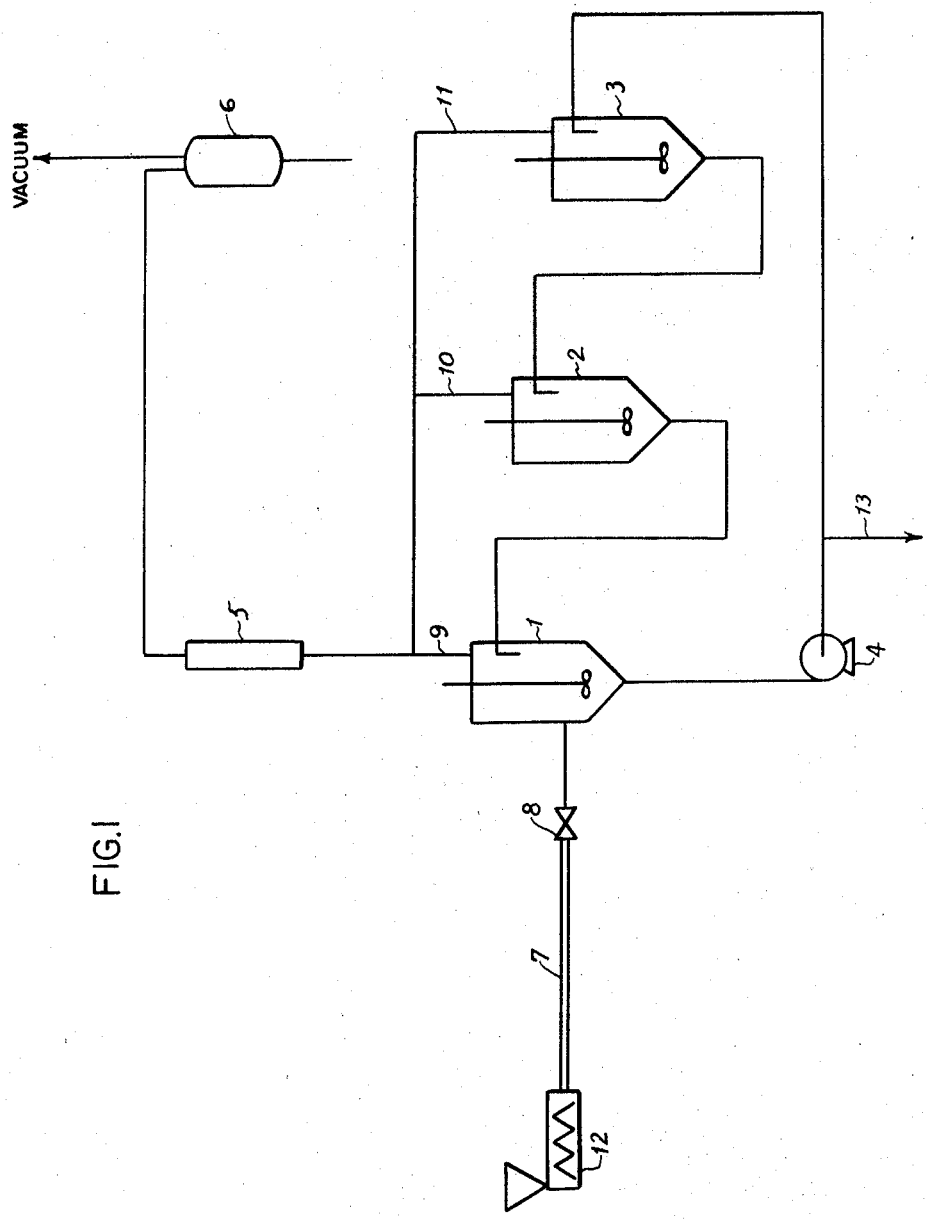

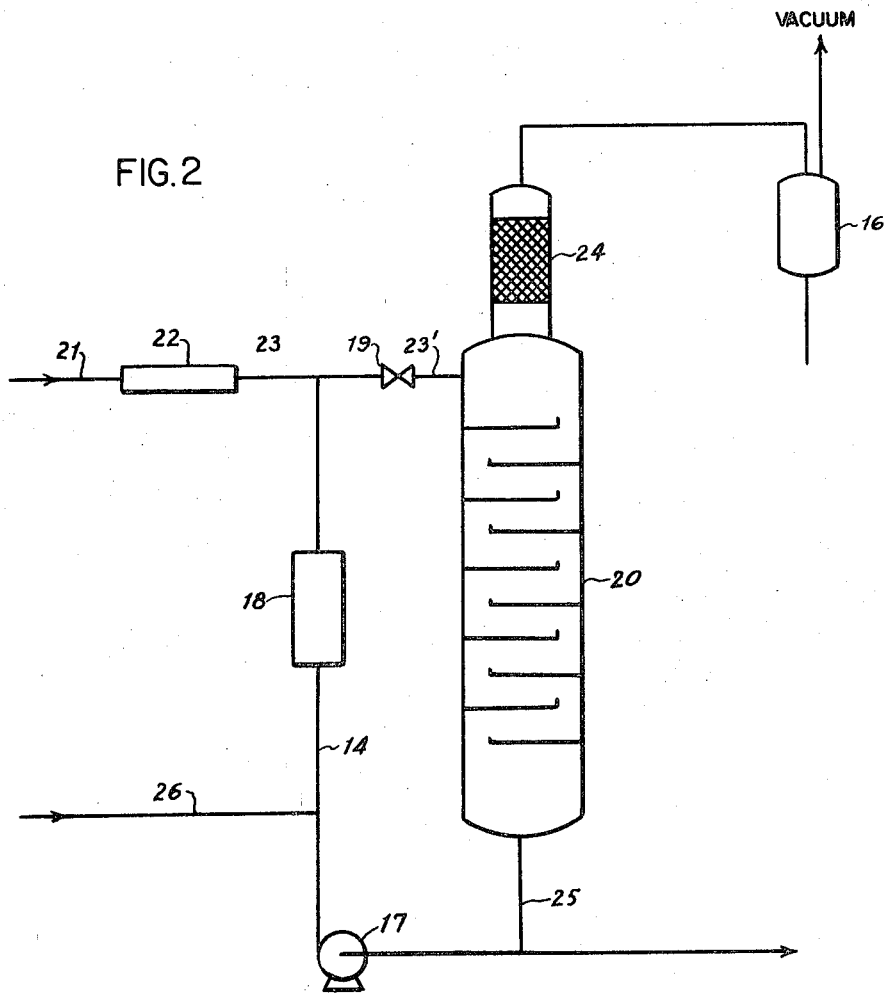

3,644,483
CONTINUOUS MANUFACTURE OF FIBER-FORMING POLYESTERS
Wolfgang Griehl, Chur, Grisons, Switzerland, and Wolf Dieter Hahn and Joachim Plenz, Frankfurt am Main, Germany, assignors to Inventa A.G. fur Forschung und Patentverwertung, Zurich, Switzerland
Filed Sept. 12, 1967, Ser. No. 667,285
Claims priority, application Switzerland, Sept. 16, 1966, 13,427/66
Int. Cl. C07c 69/82
U.S. Cl. 260—475 P
8 Claims

ABSTRACT OF THE DISCLOSURE

A process for the continuous manufacture of fiber-forming polyesters or copolyesters from dicarboxylic acids and glycols wherein the formation of undesirable diglycols is suppressed. The materials are directly esterified by introducing them into a tubular reaction zone at 150–250° wherein a considerable portion esterifiies. This product then is introduced into a precondensate of the same ingredients having a degree of polycondensation of 2–6, at a vacuum of 25–100 torr. The water of reaction and free glycol immediately evaporate under the influence of the vacuum. As soon as this reaction product attains a degree of polycondensation of 2–6, a portion thereof continuously is withdrawn in proportion to new acid introduced. The condensate withdrawn then is polycondensed in the conventional manner to a fiber-forming polyester.

In a preferred embodiment, a part of the glycol is withheld and subjected to a glycolysis with the precondensate, prior to its entry into the reaction.

---

The invention relates to a continuous or semicontinuous process for the production of linear, fiber-forming polyesters or copolyesters by direct esterification of terephthalic acid, other dicarboxylic acid, or mixtures thereof, with glycols.

Practically all saturated dicarboxylic acids which are stable at the reaction- and operational temperatures employed are suitable, that is, those acids which had been named by Carothers in his works and patents (e.g., U.S. 2,071,251).

Particular mentioned deserve the high-melting or infusible aromatic dicarboxylic acids such as napththalene dicarboxylic acids, phthalic acids, diphenylmethane dicarboxylic acids, and the like. These acids can be used by themselves or in mixture or also, e.g., mixed with suitable aliphatic or aromatic oxycarboxylic acids. All saturated dialcohols or aliphatic, cycloaliphatic or aromatic nature are suitable as glycols. Particularly suited is ethylene glycol.

The direct esterification of terephthalic acid or other high-melting or infusible dicarboxylic acids with glycols meets with considerable difficulties in practice, as is well known, because high temperatures and long periods of reaction time are required. Under such conditions, large quantities of undesirable byproducts form. Diglycols thus formed are worth particular notice because they lower the melting point of the polyester obtained and otherwise adversely affect the properties of the fibres to be manufactured from these polyesters. Aside from high temperatures and long reaction times, a large excess of free glycol also effects the undesirable diglycol formation.

It is the object of the invention to devise a process which is free of these drawbacks. The production of polyesters or copolyesters having a low diglycol content is carried out by continuously and directly esterifying terephthalic acid, other dicarboxylic acids, or mixtures thereof, if desired also in mixture with oxycarboxylic acids, with an excess of glycols at substantially 150–250° C. and at 0–50 torr, to a precondensate. This precondensate then is polycondensed in the presence of catalysts known per se, e.g., metal compounds soluble in the reaction mixture, at substantially 200–300° C. at 0.1–1.0 mm. Hg. The salient feature of the process is seen in conducting the mixture of the starting products continuously through a heated reaction tube wherein at approximately 150–250° C. a considerable portion of the mixture esterifies, and the reaction product then is sprayed into precondensate, held at 25–100 torr in a separate cycle. This precondensate, consisting of the same starting materials, has a degree of polycondensation of 2–6. Water split off in the esterification and excess of glycol are continuously distilled, and a portion of the total circulating product is withdrawn as soon as the degree of polycondensation is 2–6 and polycondensed in the presence of a catalyst.

The use of a vacuum enables keeping the partial pressure of free glycol low enough that practically no diglycol forms. Unexpectedly, the number of hydroxyl end groups in the recycled precondensate suffices to react the free carboxyl groups present in the esterification product at the point of injection.

According to a special embodiment, a small part of the glycol introduced as starting material for the esterification, is branched off and reacted with the cycled precondensate in a separate step, the so-called glycolysis. The degree of polycondensation of the precondensate thereby is lowered and the number of hydroxyl groups in end position increases, so that the ensuing reaction with the esterification product, rich on carboxyl groups, occurs rapidly and completely. Glycolysis is carried out at atmospheric or elevated pressure at temperatures of substantially 200–250° C. in a tubular reactor which is installed in the production cycle. The reaction temperature is dependent upon the kind of starting products employed and should be chosen as high as feasible in order to facilitate short reaction times. On the other hand, the possibility of byproduct formation and tendency toward discoloration of the end product are to be considered. Therefore, in the case of ethylene glycol, a temperature range of 230–270° C. appears most suitable.

A mixture of starting products which is esterified to approximately 50–80 percent can be produced by loading the starting products by means of a pump, extruder, or similar device, into a tube and heating it to temperatures therein at which the reaction takes place as rapidly as possible. Suitable temperatures, depending upon the starting products, are 150–250° C., whereby under special conditions this may be varied so as to use even lower or higher temperatures. Esterification also can be accelerated by the use of suitable catalysts, such as acid salts of aliphatic or aromatic dicarboxylic acids or inorganic phosphates. It is a particular advantage of this kind of operation that the mixture of powdered terephthalic acid and ethylene glycol (notorious for difficult handling) in the customary proportions of 1:1.1 to 1.0:1.5 liquefies by the rapidly occurring esterification. This permits good circulation and exact dosing. The esterification mix thus obtained, containing beside partly reacted starting materials monomeric and oligomeric ester, also ether and water of reaction, opportunely is injected in the cycle, which is under vacuum, below a distilling column because, under the sudden influence of the vacuum, the water formed and excess glycol immediately vaporize. After passing a suitably developed terminal esterification step, a portion of the circulating product, corresponding to the quantity of starting materials entered, is metered off and conducted to the final polycondensation, if desired or required after passing an intermediate condensation step. Polycondensation catalysts as well as other additives, e.g., optical bleaches, deadening, dulling or satining agents, advantageously are added after the reaction products have left the cycle. However, it is possible to make these additions to the starting materials.

Devices for the terminal esterification are cascade-connected reactors, tubes or troughs provided with degasification zones or correspondingly designed columns wherein the product can flow downwardly and wherein the removal of the water split off and of other products is assured.

The invention now will be more fully explained with reference to the accompanying drawings and by the Examples referring to these drawings. However, it should be understood that all these are given merely by way of illustration, and not of limitation, and that it is intended to cover all modifications and variations which do not depart from the spirit and the scope of the invention as hereinafter claimed.

Temperatures are degrees centigrade; parts and percentages, unless otherwise specified, are by weight.

FIGS. 1 and 2 are schematics in flow sheet form showing two embodiments of equipment used for carrying out the invention.

EXAMPLE 1

The equipment shown in FIG. 1 is used.

Three series-connected reactors 1, 2, 3, are supplied, by means of pump 4, with a mixture of oligomeric ethylene glycol terephthalate having an average degree of condensation of 3. The reactors are provided with agitators and jackets and are heated at 240° C. Each reactor is connected, by way of fractionating column 5 and receiver 6, to a vacuum pump (not shown) and kept at a pressure of 100 torr.

A tube 7 which is the esterification reactor and is heated at 250°, leads into reactor 1. Tube 7 is loaded with a mixture of 100 parts terephthalic acid and 55 parts ethylene glycol by means of a conveying device 12, e.g., a screw pump. The length of tube 7 is selected so that a dwelling time of 40–60 minutes is assured. The esterification mixture supplied from tube 7 into reactor 1 contains approximately 20 mol percent free carboxyl groups. It consists of substantially 82% terephthalic acid monoglycol ester and -bisglycol ester, also dimeric bisglycol ester; 7% ethyleneglycol; and 11% water.

As soon as this mixture passes the expansion valve 8, disposed in the line between tube 7 and reactor 1, the water in a sudden burst evaporates and also a large portion of the free glycol, thus furnishing additional agitation. Volatiles are caught in receiver 6 and conducted to a rectification (not shown). While passing from reactor 1 into reactors 2 and 3, the carboxyl groups still present react with the oligomeric mixture, and the water forming thereby distills off through conduits 9, 10 and 11.

Pump 4 delivers so much material that a clear precondensate is withdrawn through conduit 13 which has an acid valve of less than 30. The amount withdrawn corresponds to the quantity of terephthalic acid introduced by conveyor 12 into tube 7.

The precondensate withdrawn through conduit 13 is then polycondensed in the conventional manner. In order to accelerate the esterification, 0.02% acid potassium terephthalate are added, calculated on the quantity of terephthalic acid introduced.

EXAMPLE 2

Using the equipment shown in FIG. 2.

The apparatus shown in FIG. 2 essentially consists of a cascade reactor 20 having 10 plates, pump 17, a tubular glycolysis reactor 18 and an expansion valve 19. In this device a precondensate is circulated consisting of oligomeric ethylene glycol terephthalate having a degree of polycondensation of approximately 3. Cascade reactor 20 is connected to a vacuum pump (not shown) by way of distilling column 24 and receiver 16. Pump 17 is connected to the glycolysis by conduit 14.

The terephthalic acid and the bulk of the glycol are introduced by means of a metering device 21 into the tubular esterification reactor 22, wherein rapid reaction with solution of the solid acid occurs. To accelerate the esterification, 0.3% primary sodium orthophosphate are added to the starting materials, calculated on terephthalic acid. The esterification product is entered in the process cycle at 23 and expanded through relief valve 19 at 23' into cascade 20. A small portion of fresh glycol is added to the circulating product between pump 17 and the glycolysis reactor 18 through pipe 26 which leads into conduit 14. An amount of precondensate corresponding to terephthalic acid introduced is withdrawn through conduit 25 and subjected to polycondensation.

The following quantities and reaction conditions were used:

Circulated amount—18 l./h.
Terephthalic acid added—5 kg./h.
Glycol addition at 21—1.2 mols/mol. terephthalic acid
Glycol addition at 14—0.3 moe/mol. terephthalic acid
Glycolysis reactor 18—1.3 atmospheres, 250°
Esterification reactor 22—22 atmospheres, 230–240°
Cascade reactor 20—100 torr, entrance temp. 240°, exit temp. 250°

The precondensate withdrawn through line 25 has an intrinsic viscosity of 0.37–0.39, measured on phenol-tetrachloroethane at 25° C. It is polycondensed in the conventional manner. The polyester thus obtained has a melting range of 260–262° and intrinsic viscosities of 0.67–0.70.

EXAMPLE 3

Using the equipment according to FIG. 2.

The quantities were the same as in Example 2. The conditions in the device were changed as follows:

glycolysis reacter 18—1.5 atmospheres, 255°
cascade reactor 20—25 torr, entrance temp. 240°, exit temp. 260°

The precondensate obtained had an intrinsic viscosity of 0.44–0.46. The polyester produced therefrom had the same properties as the one according to Example 2.

We claim as our invention:

1. A process for suppressing diglycol formation upon condensation of terephthalic acid and ethylene glycol, which comprises reacting said acid with an excess over the stoichiometric amount of said glycol in a first reaction zone at 150–250° C. to produce a condensate which is about 50–80 percent esterified and having free carboxyl groups; introducing the condensate into a second reaction zone containing a precondensate of the dicarboxylic acid and the glycol esterified to between 2–6 and having end hydroxyl groups available as reaction sites, said second reaction zone being at substantially 200–260° C. and under a vacuum of substantially 25–100 mm. Hg and whereby water of reaction and excess glycol are released upon said introduction and said free carboxyl groups of said introduced condensate react with said end hydroxyl groups of the precondensate to form a reaction product, withdrawing said reaction product from the second reaction zone when its degree of polycondensation reaches 2–6, and recycling a portion thereof to said second reaction zone.

2. The process as defined in claim 1, wherein the molar proportions of said acid to said glycol range from 1:1.1 to 1.1:1.5.

3. The process as defined in claim 1, wherein the dwelling time in said first reaction zone is 40–60 minutes.

4. The process as defined in claim 1, wherein said withdrawn reaction product has an acid value of less than 30.

5. The process as defined in claim 1, wherein a part of the glycol is mixed with material from said second reaction zone and subjected to alcoholysis at substantially 200–250° C. prior to entry into said second reaction zone.

6. The process as defined in claim 1, wherein 0.02 to 0.03 weight percent calculated on said acid of a catalyst selected from the group consisting of acid salts of aliphatic and aromatic dicarboxylic acid and inorganic phosphates is added to said first reaction zone.

7. The process as defined in claim 6, wherein said catalyst is potassium terephthalate or sodium orthophosphate.

8. The process as in claim 1, wherein said reaction product is withdrawn in an amount equal to the amount of said acid reacted with said glycol in said first reaction zone.

References Cited

UNITED STATES PATENTS

| | | | |
|---|---|---|---|
| 3,101,366 | 8/1963 | Vaitekunas et al. | 260—475 |
| 3,313,844 | 4/1967 | Matsuhisa et al. | 260—475 |
| 3,390,135 | 6/1968 | Seiner | 260—475 |
| 3,444,140 | 5/1969 | Stewart et al. | 260—475 |
| 3,497,473 | 2/1970 | Kemkes | 260—475 |

FOREIGN PATENTS

| | | | |
|---|---|---|---|
| 1,013,034 | 12/1965 | Great Britain | 260—475 |

JAMES A. PATTEN, Primary Examiner

E. J. SKELLY, Assistant Examiner

U.S. Cl. X.R.

260—75 M, 473 R, 475 FR, 485 G